United States Patent
Shih et al.

(10) Patent No.: US 10,809,609 B2
(45) Date of Patent: Oct. 20, 2020

(54) PROJECTION APPARATUS

(71) Applicant: Coretronic Corporation, Hsin-Chu (TW)

(72) Inventors: Chih-Wei Shih, Hsin-Chu (TW); Yi Hung, Hsin-Chu (TW); Meng-Hsuan Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 163 days.

(21) Appl. No.: 16/215,660

(22) Filed: Dec. 11, 2018

(65) Prior Publication Data

US 2019/0187547 A1  Jun. 20, 2019

(30) Foreign Application Priority Data

Dec. 20, 2017 (CN) .......................... 2017 1 1383884

(51) Int. Cl.

| | |
|---|---|
| *G03B 21/20* | (2006.01) |
| *G02B 27/01* | (2006.01) |
| *G02B 27/09* | (2006.01) |
| *G03B 21/28* | (2006.01) |
| *G03B 21/00* | (2006.01) |
| *F21V 8/00* | (2006.01) |

(52) U.S. Cl.
CPC ....... *G03B 21/208* (2013.01); *G02B 27/0172* (2013.01); *G02B 27/0961* (2013.01); *G02B 27/0988* (2013.01); *G03B 21/005* (2013.01); *G03B 21/2013* (2013.01); *G03B 21/2066* (2013.01); *G03B 21/28* (2013.01); *G02B 6/0028* (2013.01)

(58) Field of Classification Search
CPC .... G03B 21/208; G02B 27/0101; G02B 5/02; G02B 27/0172
See application file for complete search history.

(56) References Cited

U.S. PATENT DOCUMENTS

| 5,076,664 A | 12/1991 | Migozzi |
|---|---|---|
| 6,563,626 B1 | 5/2003 | Iwasaki |

(Continued)

FOREIGN PATENT DOCUMENTS

| CN | 102928981 | 2/2013 |
|---|---|---|
| CN | 104204905 | 12/2014 |

(Continued)

OTHER PUBLICATIONS

"Search Report of Europe Counterpart Application", dated Apr. 24, 2019, p. 1-p. 8.

*Primary Examiner* — Ryan D Howard
(74) *Attorney, Agent, or Firm* — JCIPRNET (57) ABSTRACT

A projection apparatus including an image device and an illumination system is provided. The image device is configured to convert an illumination beam into an image beam. The illumination system includes an illumination light source, a diffusion device and a light uniform device. The illumination light source provides the illumination beam. The illumination beam is transmitted to the image device through the diffusion device and the light uniform device sequentially. The image beam leaves the projection apparatus and converges at a stop. The stop is located outside the projection apparatus. The image beam on the stop has desirable uniformity of an energy intensity distribution.

15 Claims, 6 Drawing Sheets

(56) References Cited

U.S. PATENT DOCUMENTS

| | | |
|---|---|---|
| 6,577,429 B1 | 6/2003 | Kurtz et al. |
| 6,646,806 B1 | 11/2003 | Bierhuizen |
| 6,829,095 B2 | 12/2004 | Amitai |
| 7,242,527 B2 | 7/2007 | Spitzer et al. |
| 7,576,916 B2 | 8/2009 | Amitai |
| 8,810,914 B2 | 8/2014 | Amitai |
| 2006/0114676 A1 | 6/2006 | Yamada et al. |
| 2006/0228073 A1 | 10/2006 | Mukawa et al. |
| 2008/0246923 A1 | 10/2008 | Wu |
| 2008/0285137 A1 | 11/2008 | Simmonds et al. |
| 2009/0040467 A1* | 2/2009 | Yamauchi ............ G02B 27/48 353/38 |
| 2009/0190222 A1 | 7/2009 | Simmonds et al. |
| 2010/0321409 A1 | 12/2010 | Komori et al. |
| 2013/0250431 A1 | 9/2013 | Robbins et al. |
| 2014/0140653 A1 | 5/2014 | Brown et al. |
| 2014/0140654 A1 | 5/2014 | Brown et al. |
| 2014/0160577 A1 | 6/2014 | Dominici et al. |
| 2014/0293434 A1 | 10/2014 | Cheng et al. |
| 2015/0003796 A1 | 1/2015 | Bennett |
| 2015/0138446 A1 | 5/2015 | Sheng |
| 2015/0323790 A1 | 11/2015 | Dominici et al. |
| 2015/0338660 A1 | 11/2015 | Mukawa |
| 2017/0023790 A1 | 1/2017 | Border et al. |
| 2017/0180685 A1 | 6/2017 | Takagi et al. |
| 2017/0285346 A1 | 10/2017 | Pan |
| 2017/0299860 A1 | 10/2017 | Wall et al. |
| 2018/0101011 A1 | 4/2018 | Shih et al. |
| 2018/0203236 A1 | 7/2018 | Shih et al. |
| 2018/0203237 A1 | 7/2018 | Shih et al. |
| 2018/0299678 A1 | 10/2018 | Singer et al. |
| 2018/0335628 A1 | 11/2018 | Hung et al. |

FOREIGN PATENT DOCUMENTS

| | | |
|---|---|---|
| CN | 105074537 | 11/2015 |
| CN | 103135234 | 3/2017 |
| EP | 2905655 | 8/2015 |
| JP | 2003029203 | 1/2003 |
| JP | 3610931 | 1/2005 |
| TW | 201015232 | 4/2010 |
| TW | I484219 | 5/2015 |
| TW | 201520603 | 6/2015 |
| WO | 2011024291 | 3/2011 |
| WO | 2016179246 | 11/2016 |

* cited by examiner

PROJECTION APPARATUS

CROSS-REFERENCE TO RELATED APPLICATION

This application claims the priority benefit of China application serial no. 201711383884.3, filed on Dec. 20, 2017. The entirety of the above-mentioned patent application is hereby incorporated by reference herein and made a part of this specification.

BACKGROUND OF THE DISCLOSURE

1. Field of the Disclosure

The disclosure relates to a projection apparatus and particularly relates to a projection apparatus for a head-mounted display.

2. Description of Related Art

A near eye display (NED) and a head-mounted display (HMD) are the next generation of killer products that have enormous potential for development at present. The relevant application of a near eye display technique may be categorized into an augmented reality (AR) technique and a virtual reality (VR) technique currently. For the augmented reality technique, researchers are now committed to working on how to provide optimum image quality on the premise that the display is lightweight and thin. In the optical structure of augmented reality, after a projection apparatus emits an image beam that is to be displayed, whether an energy intensity distribution outside a stop is uniform influences picture uniformity perceived by the human eye, thereby influencing the visual quality for a user. Therefore, how to enable the user to have desirable visual quality for a pleasant user experience is now one of the significant issues.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE DISCLOSURE

The disclosure provides a projection apparatus whose image beam has a uniform energy intensity distribution on a stop.

Other purposes and advantages of the disclosure may be further understood based on the technical features disclosed by the disclosure.

To achieve one, some or all of the purposes above or other purposes, an embodiment of the disclosure provides a projection apparatus. The projection apparatus includes an image device and an illumination system. The image device is configured to convert a first illumination beam into an image beam. The illumination system includes a first illumination light source, a diffusion device and a light uniform device. The first illumination light source provides a first illumination beam that is transmitted to the image device through the diffusion device and the light uniform device sequentially. The image beam leaves the projection apparatus and converges at a stop that is located outside the projection apparatus. The diffusion device is configured to allow the image beam to have an energy intensity distribution, where a peak value M1 and a valley value M2 are included, a uniformity M equals $(M1-M2)/(M1+M2) \times 100\%$, and the peak value M1 is greater than the valley value M2, in a reference direction of the stop.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A"

component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
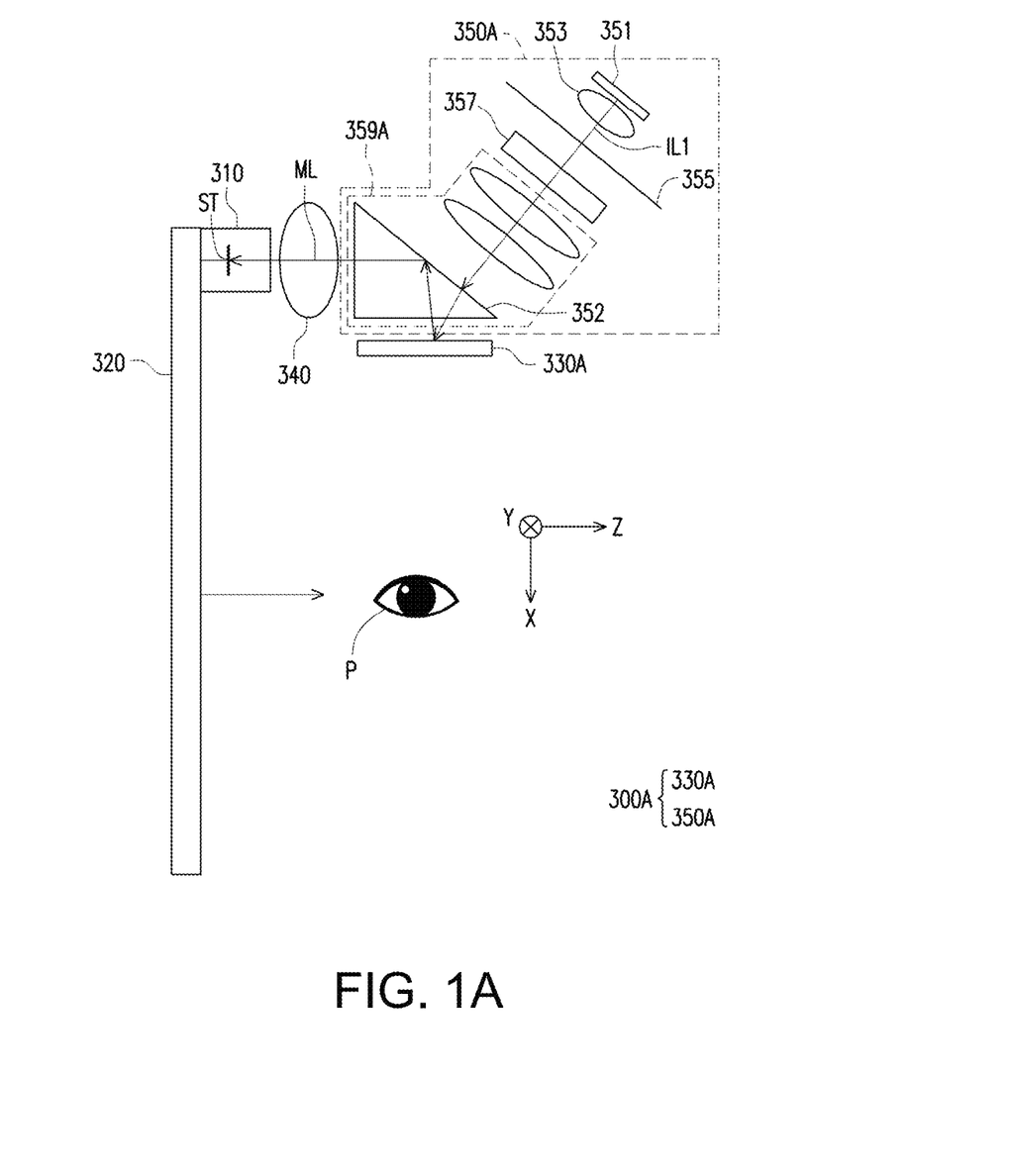
FIG. 1A is a schematic view of a projection apparatus according to an embodiment of the disclosure.

FIG. 1A is a schematic view of a projection apparatus according to an embodiment of the disclosure. Referring to FIG. 1A, a projection apparatus 300A according to the embodiment of the disclosure includes an illumination system 350A and an image device 330A. The projection apparatus 300A is used in a head-mounted display. In the embodiment, the image device 330A is, for example, a digital micromirror device (DMD) that is configured to convert an illumination beam IL1 (a first illumination beam) from the illumination system 350A into an image beam ML. The image beam ML is transmitted to a target P such as human eyes through a lens module 340 and a waveguide system. The waveguide system includes a first waveguide device 310 and a second waveguide device 320. The lens module 340 and the waveguide system as shown in FIG. 1 are merely described with the embodiments, but not limited to the disclosure.

In the embodiment, the image beam ML leaves the projection apparatus 300A and converges at a stop ST. The stop ST is located outside the projection apparatus 300A, like in the waveguide system. The stop ST has the smallest cross-sectional area of the condensed image beam. For example, in the embodiment, the stop ST is round and is located on a plane formed by an X axis and a Y axis and moreover, the stop ST has the same size in the X axis direction as in the Y axis direction. In the embodiment, after the image beam ML leaves the projection apparatus 300A, the smallest cross-sectional area of the condensed image beam ML is available on the stop ST. Therefore, the image beam ML converges at the stop ST after passing the projection apparatus 300A, and diverges after passing through the stop ST.

In the embodiment, the illumination system 350A is configured to provide the illumination beam IL1 for the image device 330A. The illumination system 350A includes an illumination light source 351 (a first illumination light source), a collimating lens set 353, a diffusion device 355, a light uniform device 357 and a prism module 359A. The illumination light source 351, such as a light emitting diode (LED), provides the illumination beam ILL In other embodiments, the illumination light source 351 is, for example, a laser diode. The illumination beam IL1 is transmitted to the image device 330A through the collimating lens set 353, the diffusion device 355, the light uniform device 357 and the prism module 359A. In the embodiment, the diffusion device 355 is, for example, a diffuser with a diffuser angle of 60 degrees, but is not limited thereto. It is feasible to use a diffuser with different diffuser angles, depending on design. The diffusion device 355 may be made into a sheet having a thickness of less than 0.5 mm and is disposed between the collimating lens set 353 and the light uniform device 357. The light uniform device 357 is, for example, a single lens array, and the lens array may also be a fly-eye lens array. In the embodiment, the light uniform device 357 may be formed by a plurality of lens arrays, but is not limited thereto. In the embodiment, the prism module 359A includes a prism 352 (a first prism). The illumination beam IL1 from the light uniform device 357 is transmitted to the image device 330A through the prism 352. In the embodiment, the diffusion device 355 is disposed between the illumination light source 351 and the light uniform device 357. Therefore, the image beam ML has a uniform energy intensity (brightness) distribution on the stop.

Figure 1B:
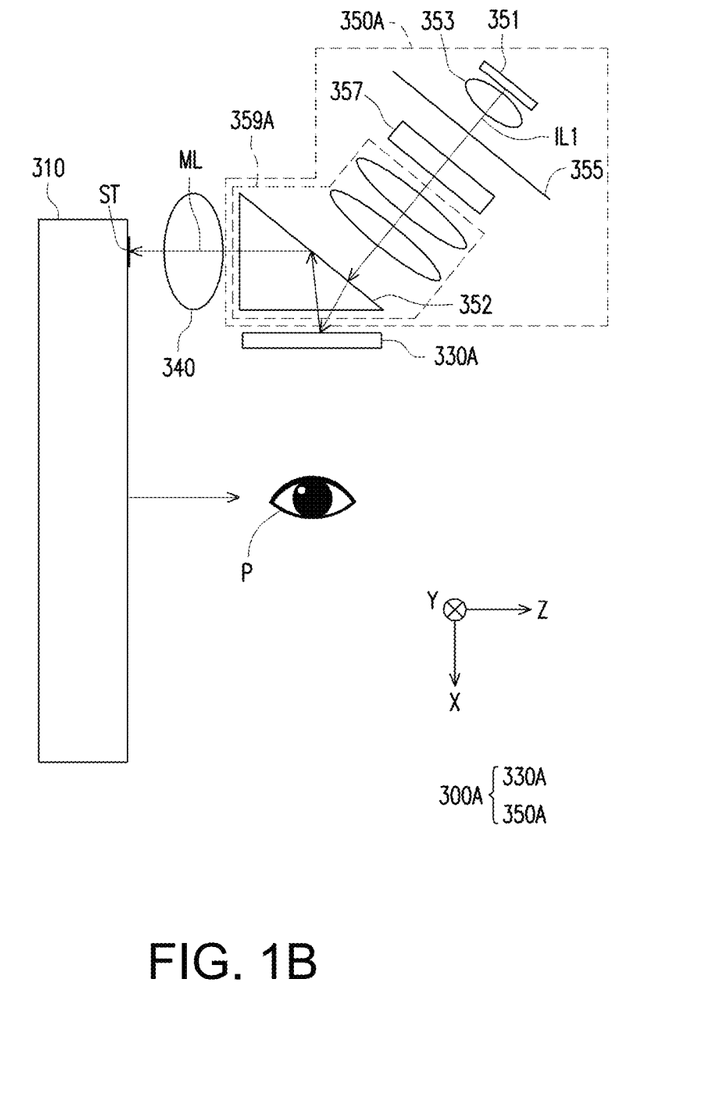
FIG. 1B is a schematic view of a projection apparatus according to another embodiment of the disclosure.

FIG. 1B is a schematic view of a projection apparatus according to another embodiment of the disclosure. Referring to FIGS. 1A and 1B, the main differences are that the projection apparatus 300A projects the image beam ML that is transmitted to the target P through the lens module 340 and the waveguide system. The waveguide system only has a first waveguide device 310. In the embodiment, the image beam ML leaves the projection apparatus 300A and converges at the stop ST. The stop ST is located outside the projection apparatus 300A, like in a region of a light entrance surface of the first waveguide device 310.

Figure 2:
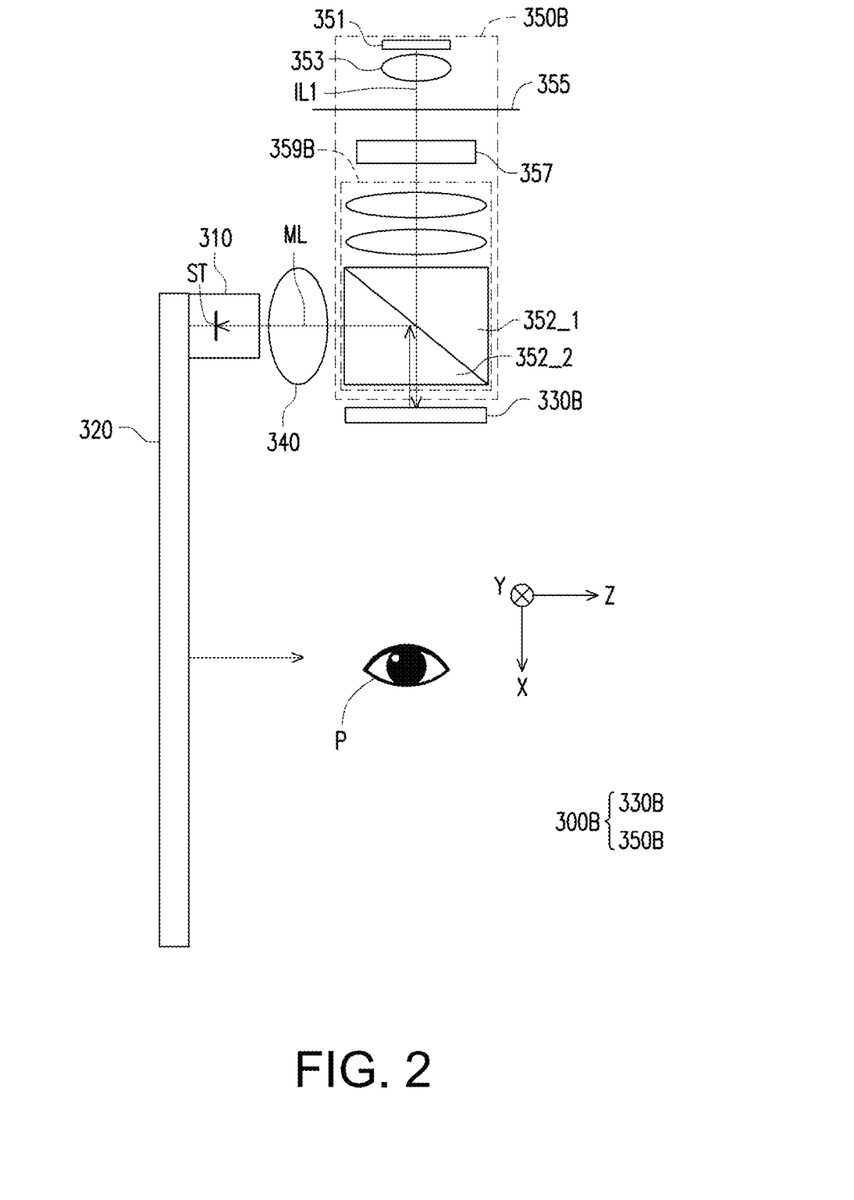
FIG. 2 is a schematic view of a projection apparatus according to another embodiment of the disclosure.

FIG. 2 is a schematic view of a projection apparatus according to another embodiment of the disclosure. Referring to FIGS. 1A and 2, a projection apparatus 300B according to the embodiment is similar to the projection apparatus 300A in FIG. 1A, but the main difference between the projection apparatus 300A and the projection apparatus 300B lies in, for example, design methods of an illumination system 350B and an image device 330B.

Specifically, in the embodiment, the image device 330B includes, for example, a liquid crystal on silicon (LCoS) display that is configured to convert the illumination beam IL1 from the illumination system 350B into the image beam ML. The image beam ML is transmitted to the target P through the waveguide system. In the embodiment, the illumination system 350B is configured to provide the illumination beam IL1 for the image device 330B. The diffusion device 355 is disposed between the collimating lens set 353 and the light uniform device 357. In the embodiment, a prism module 359B includes a first prism 352_1 and a second prism 352_2. A coating layer of a polarity or a film of a polarity between the first prism 352_1 and the second prism 352_2 forms a polarizing beam splitter (PBS). The partial illumination beam IL1 of a first polarity that comes from the light uniform device 357 is transmitted to the image device 330B through the first prism 352_1 and the second prism 352_2. The image device 330B converts the partial illumination beam IL1 of the first polarity into the partial illumination beam IL1 of a second polarity and reflects the partial illumination beam IL1 of the second polarity to the polarizing beam splitter. The polarizing beam splitter reflects the partial illumination beam IL1 of the second polarity to the lens module 340.

In the embodiment, the image beam ML leaves the projection apparatus 300B and converges at the stop ST. The stop is located outside the projection apparatus 300B, like in the waveguide system. In the embodiment, the diffusion device 355 is disposed between the illumination light source 351 and the light uniform device 357. Therefore, the image beam ML has a uniform energy intensity distribution on the stop ST.

Figure 3:
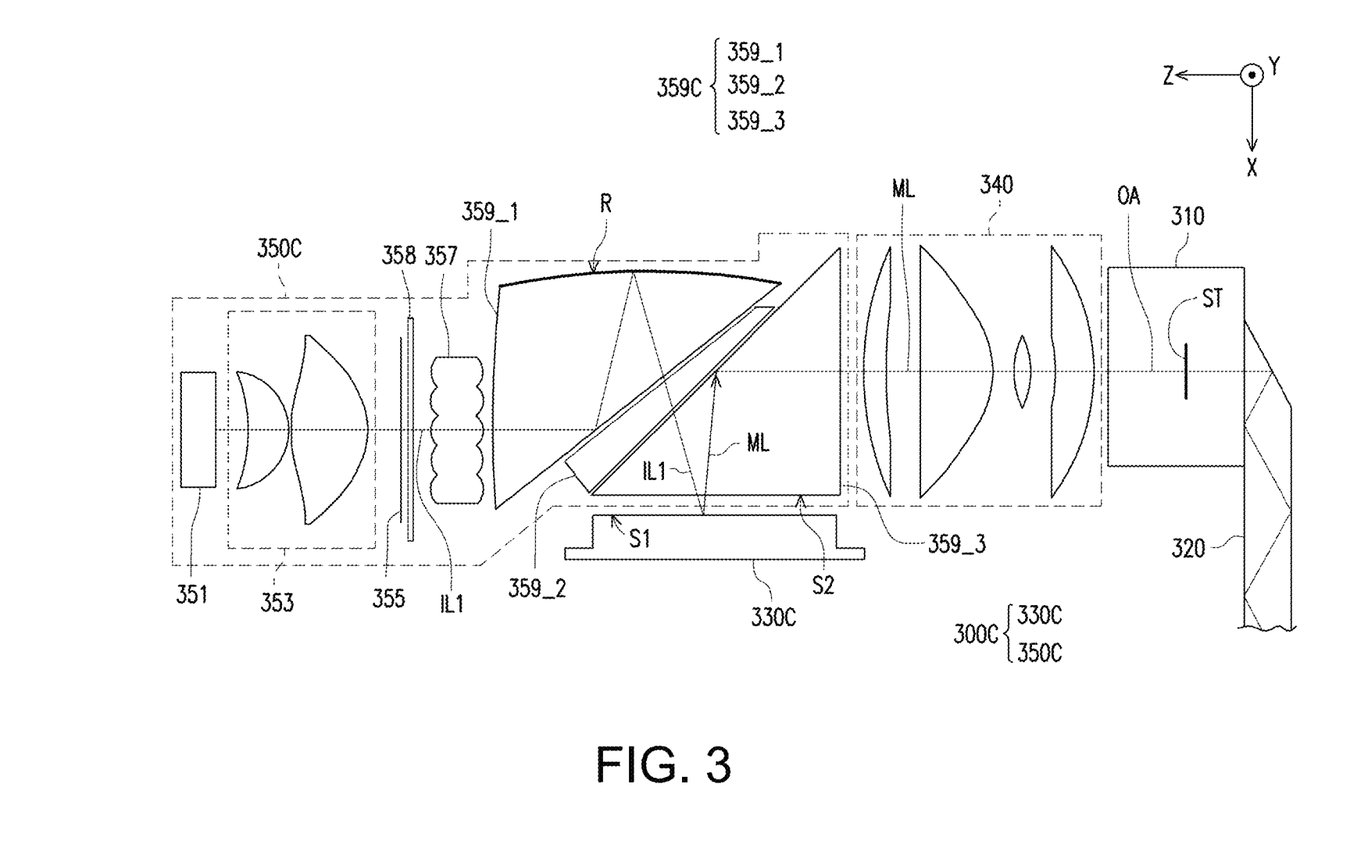
FIG. 3 is a schematic view of a projection apparatus according to another embodiment of the disclosure.

FIG. 3 is a schematic view of a projection apparatus according to another embodiment of the disclosure. Referring to FIGS. 1A and 3, a projection apparatus 300C according to the embodiment is similar to the projection apparatus 300A in FIG. 1A, but the main difference between the projection apparatus 300C and the projection apparatus 300A lies in a design method of a prism module 359C.

Specifically, in the embodiment, an image device 330C includes, for example, a digital micromirror device that is configured to convert the illumination beam IL1 from an illumination system 350C into the image beam ML. The image beam ML is transmitted to the target P through the waveguide system. In the embodiment, the prism module 359C includes a first prism 359_1, a second prism 359_2 and a third prism 359_3. In the embodiment, the first prism 359_1 has a curved surface that may further have a reflection layer R. The reflection layer R may be a reflective coating layer or formed by attaching a reflective sheet to the curved surface of the first prim 359_1. The curved surface is configured to reflect the illumination beam IL1 from the light uniform device 357, but is not limited thereto. In other embodiments, the first prism 359_1 has a curved surface, but does not need the reflection layer R. With a full reflection characteristic, the curved surface of the first prism 359_1 may be configured to reflect the illumination beam IL1 from the light uniform device 357, but is not limited thereto.

In the embodiment, air gaps are available between the two prisms in FIG. 3. For example, a first gap is located between the first prism 359_1 and the second prism 359_2. A second gap is located between the second prism 359_2 and the third prism 359_3. The illumination beam IL1 from the light uniform device 357 is transmitted to the image device 330C through the first prism 359_1, the curved surface of the first prism 359_1, the first gap, the second prism 359_2, the second gap and the third prism 359_3 sequentially. In another embodiment, the first prism 359_1 is bonded to the second prism 359_2 with a transparent plastic material, and the second prism 359_2 may be bonded to the third prism 359_3. The transparent plastic material, the first prism 359_1, the second prism 359_2 and the third prism 359_3 have different refractive indexes.

In addition, in the embodiment, the illumination beam IL1 from the illumination light source 351 may converge at an aperture stop 358 within the illumination system 350C, so ghost images on an image screen may be reduced. The aperture stop 358 is, for example, located behind the diffusion device 355, but is not limited thereto. In another embodiment, the aperture stop 358 is, for example, located in front of the diffusion device 355, like between the collimating lens set 353 and the diffusion device 355, or between the diffusion device 355 and the light uniform device 357. The aperture stop 358 is a tangible object and may have a driving device (not shown). The driving device is configured to control the size of an aperture of the aperture stop 358. Therefore, the aperture stop 358 may adjust the light amount of the illumination beam IL1 passing through the aperture of the aperture stop 358. In an embodiment, the aperture of the aperture stop 358 may be of fixed size. In the embodiment, the illumination beam ML leaves the projection apparatus 300C and converges at the stop ST that is located outside the projection apparatus 300C. In the embodiment, the stop ST is, for example, located in the first waveguide device 310.

In the embodiment, the image device 330C includes a light valve. The light valve has an active surface S1 configured to receive all the first illumination beams IL1 from the illumination system 350C. An area of the active surface S1 receiving the first illumination beam IL1 is smaller than an area of a surface S2 of the third prism 359_3 facing the active surface S1 of the light valve. That is, S1 is greater than S2. Therefore, the active surface S1 of the light valve receiving the illumination beam IL1 from the third prism 359_3 has the largest effective irradiation range that is useful for making the most of the active surface S1 of the light valve.

Figure 4:
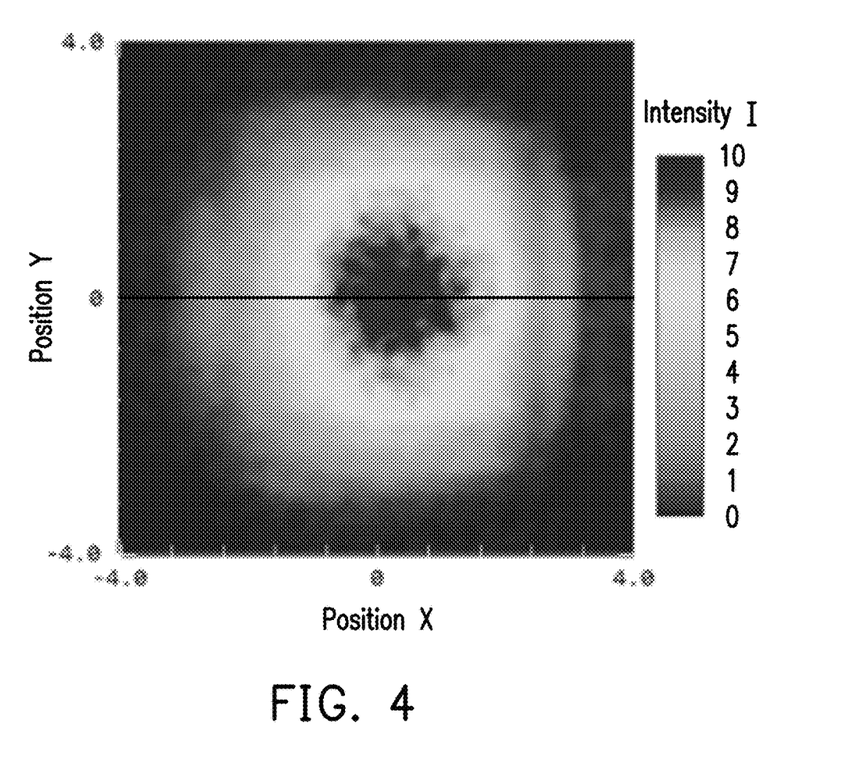
FIG. 4 is a graph illustrating an energy intensity distribution of an image beam outside a stop.
Figure 5:
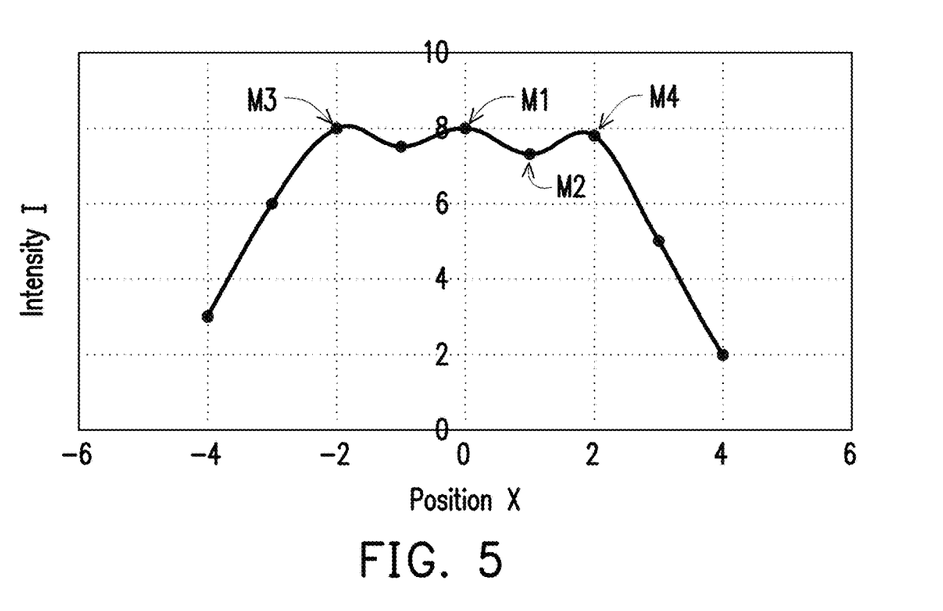
FIG. 5 is a curve illustrating the energy intensity distribution of an image beam in an X direction where Y=0.

FIG. 4 is a graph illustrating an energy intensity distribution of an image beam on a stop. FIG. 5 is a curve illustrating an energy intensity distribution of an image beam in an X direction where Y=0. In the embodiment, the energy intensity distribution of the image beam ML in a position of the X direction (reference direction) of the stop ST, where Y=0, includes many peak values and valley values. The peak value M1 is the greatest among all the peak values and is closest to a center of the stop ST. In the embodiment, the center of the stop ST is, for example, where an optical axis OA passes through the stop ST. The valley value M2 is the lowest intensity value between the peak value M1 and another peak value adjacent to the peak value M1. In the embodiment, the another peak value may be a left peak value M3 or a right peak value M4 that is adjacent to the peak value M1. Therefore, the valley value M2 is selected from a valley value between the peak value M1 and the right peak value M4. In other embodiments, the valley value may be selected from the lowest intensity value between the peak value M1 and the left peak value M3. In the embodiment, uniformity M of the energy intensity distribution of the image beam ML on the stop ST equals (M1−M2)/(M1+M2)×100%, and M1 is greater than M2. In another embodiment, the uniformity M of the energy intensity distribution is less than 15%. In the embodiment, the uniformity M of the energy intensity distribution is less than 10%. A smaller M value indicates that the image beam ML has a more uniform energy intensity distribution on the stop ST. Therefore, in the embodiment, the diffusion device 355 is disposed between the illumination light source 351 and the light uniform device 357. Therefore, the image beam ML has a uniform energy intensity distribution on the stop ST. For example, in FIG. 5, the peak value M1=8, the valley value M2=7.3, the peak value M4=7.9, M=(8−7.3)/(8+7.3)×100%=4.5%, and M is less than 10%.

The diffusion device 355 includes a diffuser. A diffuser angle of the diffuser may be circular symmetrical, monosymmetrical or asymmetrical. The disclosure is not limited to the type of diffuser.

Figure 6:
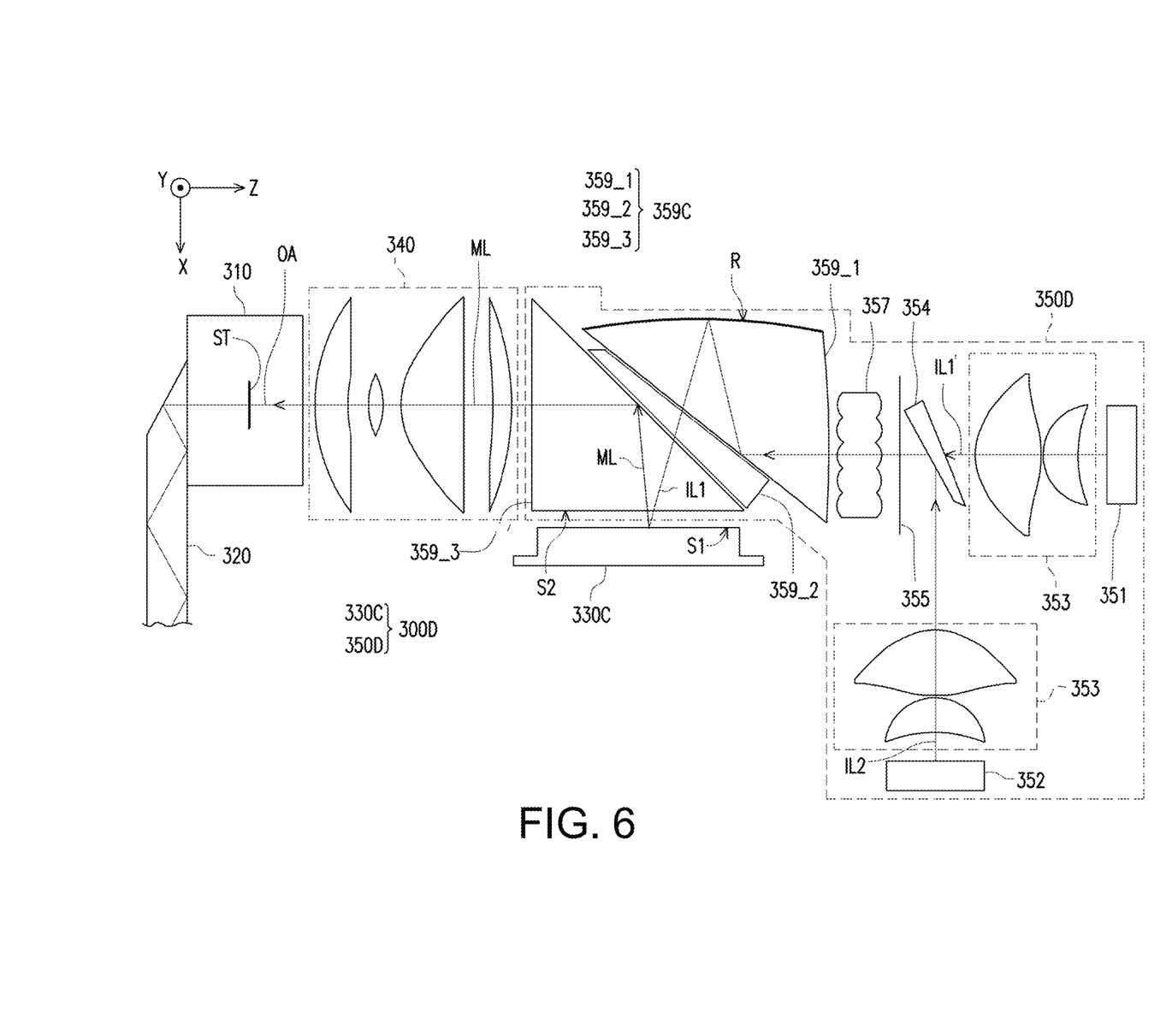
FIG. 6 is a schematic view of a projection apparatus according to another embodiment of the disclosure.

FIG. 6 is a schematic view of a projection apparatus according to another embodiment of the disclosure. Referring to FIGS. 3 and 6, a projection apparatus 300D according to the embodiment is similar to the projection apparatus 300C in FIG. 3, but the main difference between the projection apparatus 300D and the projection apparatus 300C lies in a design method of an illumination system 350D. Specifically, in the embodiment, the illumination system 350D further includes the second illumination light source 352 and a light combining device 354. The second illumination light source 352 is configured to provide the second illumination beam IL2. The light combining device 354 is, for example, a wedge prism configured to integrate a third illumination beam IL1' with the second illumination beam IL2 to form the first illumination beam IL1. The third illumination beam IL1' is, for example, red light, and the second illumination beam IL2 is, for example, green light and blue light, but the embodiment is not limited thereto. The first illumination beam IL1 is transmitted to the image device 330C through the diffusion device 355, the light uniform device 357 and the prism module 359C sequentially. In other embodiments, the light combining device 354 is, for example, a dichroic mirror configured to integrate the third illumination beam IL1' with the second illumination beam IL2 to for the first illumination beam IL1.

In view of the foregoing, in the exemplary embodiments of the disclosure, the illumination system includes the diffusion device disposed between the illumination beam and the light uniform device to allow the image beam to have a uniform energy intensity distribution on the stop.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
   an image device, configured to convert a first illumination beam into an image beam; and
   an illumination system comprising:
      a first illumination light source;
      a diffusion device; and
      a light uniform device, wherein the first illumination light source provides the first illumination beam, the first illumination beam is transmitted to the image device through the diffusion device and the light uniform device sequentially,
   wherein the image beam leaves the projection apparatus and converges at a stop, the stop is located outside the projection apparatus,
   wherein the diffusion device is configured to allow the image beam to have an energy intensity distribution, where a peak value M1 and a valley value M2 are included, a uniformity M equals $(M1-M2)/(M1+M2)\times 100\%$, and the peak value M1 is greater than the valley value M2, in a reference direction of the stop.

2. The projection apparatus of claim 1, wherein the peak value M1 is the greatest value among the peak values and is closest to a center of the stop, and the valley value M2 is located between the peak value M1 and another peak value adjacent to the valley value M2.

3. The projection apparatus of claim 1, wherein the illumination system further comprises a collimating lens set and a prism module, the first illumination beam is transmitted to the image device through the collimating lens set, the diffusion device, the light uniform device and the prism module sequentially.

4. The projection apparatus of claim 3, wherein the light uniform device is a lens array.

5. The projection apparatus of claim 3, wherein the illumination system further comprises an aperture stop, the aperture stop is disposed between the collimating lens set and the light uniform device.

6. The projection apparatus of claim 3, wherein the prism module comprises a first prism, and the first illumination beam from the light uniform device is transmitted to the image device through the first prism.

7. The projection apparatus of claim 3, wherein the prism module comprises a first prism, a second prism and a third prism, and the first illumination beam from the light uniform device is transmitted to the image device through the first prism, the second prism and the third prism.

8. The projection apparatus of claim 7, wherein a first gap is located between the first prism and the second prism, a second gap is located between the second prism and the third prism, and the first illumination beam from the light uniform device is transmitted to the image device through the first gap and the second gap.

9. The projection apparatus of claim 7, wherein the first prism has a curved surface that is configured to reflect the first illumination beam from the light uniform device.

10. The projection apparatus of claim 7, wherein the first prism has a reflection layer that is configured to reflect the first illumination beam from the light uniform device.

11. The projection apparatus of claim 7, wherein the image device comprises a light valve having an active surface that is configured to receive the first illumination beam from the illumination system, and an area of the active surface of the light valve receiving the first illumination beam is smaller than an area of a surface of the third prism facing the active surface of the light valve.

12. The projection apparatus of claim 1, wherein the illumination system further comprises a second illumination light source that is configured to provide a second illumination beam.

13. The projection apparatus of claim 12, wherein the illumination system further comprises a light combining device that integrates the second illumination beam to form the first illumination beam, wherein the first illumination beam is transmitted to the image device through the diffusion device and the light uniform device sequentially.

14. The projection apparatus of claim 1, wherein the image beam has the uniformity M of less than 15% on the stop.

15. The projection apparatus of claim 1, wherein the image beam has the uniformity M of less than 10% on the stop.

* * * * *